United States Patent
Wang (10) Patent No.: US 8,139,837 B2
(45) Date of Patent: Mar. 20, 2012

(54) BONE NUMBER DETERMINATION APPARATUS AND RECORDING MEDIUM HAVING STORED THEREIN PROGRAM

(75) Inventor: Caihua Wang, Minato-ku (JP)

(73) Assignee: Fujifilm Corporation, Tokyo (JP)

( * ) Notice: Subject to any disclaimer, the term of this patent is extended or adjusted under 35 U.S.C. 154(b) by 442 days.

(21) Appl. No.: 12/414,383

(22) Filed: Mar. 30, 2009

(65) Prior Publication Data
US 2009/0245608 A1    Oct. 1, 2009

(30) Foreign Application Priority Data
Mar. 31, 2008  (JP) .................. 2008-092173

(51) Int. Cl.
*G06K 9/00* (2006.01)
(52) U.S. Cl. .......................... 382/131; 378/4
(58) Field of Classification Search ............... 378/4–20, 378/901; 382/131, 128
See application file for complete search history.

(56) References Cited

U.S. PATENT DOCUMENTS
2006/0062425 A1    3/2006  Shen et al.
2007/0110295 A1*   5/2007  Shen et al. ............ 382/131

FOREIGN PATENT DOCUMENTS
| JP | 06-251038 | 9/1994 |
| JP | 2006-175057 | 6/2006 |
| JP | 2006-034585 | 9/2006 |
| JP | 2007-111534 | 10/2007 |

OTHER PUBLICATIONS

Naegel, "Using mathematical morphology for the anatomical labeling of vertebrae from 3D CT-scan images", Computerized Medical Imaging and Graphics 31, 2007, vol. 31, Issue 3, pp. 141-156.
Uehara et al., "Quantitative Evaluation of Osteoporosis of Likelihood using Multi-slice CT images", IEICE Technical Report, MI2005-90, 2005, pp. 97-100.

* cited by examiner

*Primary Examiner* — Hoon Song
(74) *Attorney, Agent, or Firm* — Birch, Stewart, Kolasch & Birch, LLP.

(57) ABSTRACT

A body-of-sternum area representing the body of sternum of a subject is extracted from a three-dimensional image obtained by imaging the subject. Further, at least one rib area is extracted from the three-dimensional image. The rib number of each of the at least one rib area is determined based on a position of the body-of-sternum area, the position corresponding to a lower border of the body of sternum, and the position of each of the at least one rib area. Further, at least one vertebra area is extracted from the three-dimensional image. The vertebra number of the at least one vertebra area is determined based on the position of each of the at least one rib area, the rib number of each of the at least one rib area, and the position of the at least one vertebra area.

9 Claims, 8 Drawing Sheets

BONE NUMBER DETERMINATION APPARATUS AND RECORDING MEDIUM HAVING STORED THEREIN PROGRAM

BACKGROUND OF THE INVENTION

1. Field of the Invention

The present invention relates to a bone number determination apparatus for analyzing the anatomical positions of bones in medical images and a computer-readable recording medium that has stored a program for the apparatus.

2. Description of the Related Art

In recent years, in the field of medicine, a series of three-dimensional images composed of a multiplicity of tomograms (tomographic images, slice images or cross-sectional images) are obtained by scanning the human body of a patient from the chest to the groins thereof, and used for diagnosing the patient. In such diagnosis, a technique for automatically detecting the positions of vertebrae and ribs is essential to recognition of various anatomical positions in the human body of the patient.

A technique for separating vertebrae from each other is proposed, for example, in "Quantitative Evaluation of Osteoporosis Likelihood using Multi-slice CT Images", M. Uehara et al., IEICE Technical Report, MI2005-90, pp. 97-100, 2005 (hereinafter, referred to as "Non-Patent Literature 1"). In Non-Patent Literature 1, morphology operation is performed on tomograms to extract vertebral endplates and intervertebral regions, thereby separating (segmenting) the vertebrae from each other. Further, another technique is proposed in "Using Mathematical Morphology for the Anatomical Labeling of Vertebrae from 3D CT-Scan Images", B. Naegel, Computerized Medical Imaging and Graphics, Vol. 31, Issue 3, pp. 141-156, 2007 (hereinafter, referred to as "Non-Patent Literature 2"). In Non-Patent Literature 2, morphology operation is performed on tomograms to detect intervertebral region candidate areas. Further, intervertebral areas are detected by using projection values of pixels in the detected intervertebral region candidate areas to separate (segment) the vertebrae from each other.

Meanwhile, it is important to know the numbers of vertebrae (vertebra numbers) to accurately recognize anatomical positions in a patient. However, since the vertebrae are similar to each other, it is difficult to identify the vertebra number of a vertebra only based on the vertebra per se. When an image includes the twelfth rib and the first rib of the patient, it is possible to accurately know the rib numbers of the ribs. Therefore, the twelfth vertebra or the first vertebra is identified based on the connection between the twelfth vertebra and the twelfth rib or the connection between the first vertebra and the first rib, respectively (or based on both of the connections). Further, the vertebra numbers of other vertebrae are identified based on the twelfth vertebra or the first vertebra.

However, in the conventional techniques, in which the vertebra numbers are identified based on the connection between the twelfth rib and the vertebra or the connection between the first rib and the vertebra, if neither the twelfth rib nor the first rib is included in the image, it is impossible to identify the vertebra numbers. Further, it is impossible to identify even the rib numbers per se.

SUMMARY OF THE INVENTION

In view of the foregoing circumstances, it is an object of the present invention to provide a bone number determination apparatus that can identify vertebra numbers (or vertebral-body numbers) and rib numbers even in a three-dimensional image that includes neither the first rib nor the twelfth rib of a patient. Further, it is another object of the present invention to provide a computer-readable recording medium that has stored a program for the apparatus.

A bone number determination apparatus according to the present invention is a bone number determination apparatus comprising:

an image storage means that stores a three-dimensional image composed of a plurality of tomograms obtained by imaging a human body;

a body-of-sternum area extraction means that extracts a body-of-sternum area representing the body of sternum of the human body from the three-dimensional image;

a rib area extraction means that extracts at least one rib area, each representing an individual rib, from the three-dimensional image; and a rib number determination means that determines the rib number of each of the at least one rib area based on a position of the body-of-sternum area extracted by the body-of-sternum area extraction means, the position corresponding to a lower border (lower end) of the body of sternum, and the position of each of the at least one rib area.

Further, a computer-readable recording medium that has stored a program according to the present invention is a computer-readable recording medium that has stored a program for causing a computer to function as:

a body-of-sternum area extraction means that extracts a body-of-sternum area representing the body of sternum of a human body from a three-dimensional image composed of a plurality of tomograms obtained by imaging the human body;

a rib area extraction means that extracts at least one rib area, each representing an individual rib, from the three-dimensional image; and a rib number determination means that determines the rib number of each of the at least one rib area based on a position of the body-of-sternum area extracted by the body-of-sternum area extraction means, the position corresponding to a lower border of the body of sternum, and the position of each of the at least one rib area.

Here, the term "rib area" refers to an area of an image in which one of a plurality of ribs is imaged.

Further, the bone number determination apparatus may further includes:

a vertebra area extraction means that extracts at least one vertebra area, each representing an individual vertebra, from the three-dimensional image; and a vertebra number determination means that determines the vertebra number of each of the at least one vertebra area based on the position of each of the at least one rib area, the rib number of each of the at least one rib area that has been determined by the rib number determination means, and the position of the at least one vertebra area.

Further, the computer-readable recording medium that has stored the program according to the present invention may be a computer-readable recording medium that has stored a program for causing a computer to further function as:

a vertebra area extraction means that extracts at least one vertebra area, each representing an individual vertebra, from the three-dimensional image; and a vertebra number determination means that determines the vertebra number of each of the at least one vertebra area based on the position of each of the at least one rib area, the rib number of each of the at least one rib area that has been determined by the rib number determination means, and the position of the at least one vertebra area.

Here, the term "vertebra" refers to each of bones forming a vertebral column (a spinal column or a backbone). Adjacent vertebrae are connected to each other at an intervertebral region through an intervertebral disk.

Further, the term "vertebra area" refers to an area of an image in which one of the plurality of vertebrae forming the vertebral column is imaged.

Further, the rib number determination means may determine that a rib area that is located at a higher position than the position corresponding to the lower border of the body of sternum and that is located at the lowest position among the at least one rib area that is connected to the body-of-sternum area is a fifth rib.

Further, the vertebra number determination means may determine that the rib number of one of the at least one rib area that has a largest overlapping projection area with a projection area of one of the at least one vertebra area when a portion of each of the at least one rib area, the portion being present within a predetermined distance from a center line of the at least one vertebra area along the direction of the body axis of the human body, and the at least one vertebra area are projected onto the body axis is the vertebra number of the one of the at least one vertebra area.

According to the present invention, a body-of-sternum area in which the body of sternum is imaged and at least one rib area are extracted from a three-dimensional image. Further, the rib number of each of the at least one rib area is determined based on a position of the body-of-sternum area, the position corresponding to a lower border of the body of sternum, and a position of each of the at least one rib area. Therefore, even if not all of 12 ribs (12 pairs of ribs) are imaged, it is possible to identify the rib number of the rib based on the position of the body of sternum and the position of the rib.

Further, the vertebra number of a vertebra is determined based on the rib number, which has been determined based on the position of the lower border of the body of sternum, the position of the rib area, and the position of the vertebra area. Therefore, even if not all of 12 ribs (12 pairs of ribs) are imaged, it is possible to identify the vertebra number of the vertebra.

Further, as described above, in the present invention, the rib number of each rib is determined based on a position of the body-of-sternum area, the position corresponding to a lower border of the body of sternum, and a position of the rib area of each rib. Further, the vertebra number is identified based on the determined rib number and the degree of overlapping of the vertebra area and the rib area with respect to the direction of the body axis. Therefore, it is possible to accurately identify the vertebra number.

Note that those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

DESCRIPTION OF THE PREFERRED EMBODIMENTS

Figure 1:
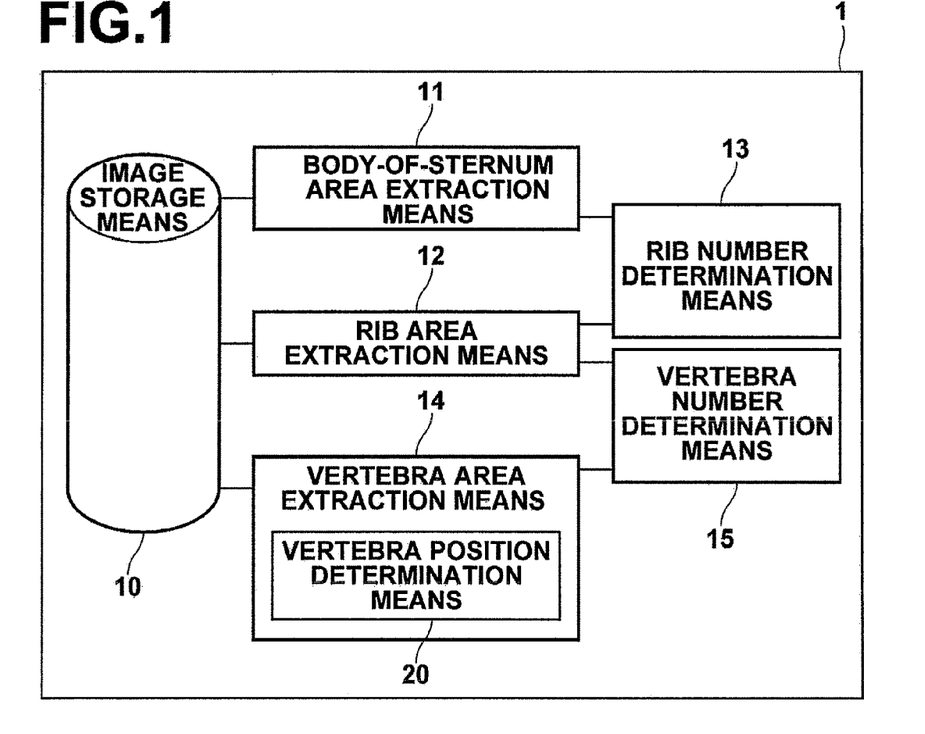
FIG. 1 is a schematic diagram illustrating the configuration of a bone number determination apparatus.

Hereinafter, embodiments of the present invention will be described with reference to drawings. FIG. 1 is a schematic diagram illustrating the configuration of a bone number determination apparatus.

A bone number determination apparatus 1 is realized by causing a computer (a work station or the like, for example) to execute an application program installed in an auxiliary storage device thereof. A bone number determination program may be distributed by being stored in a recording medium, such as a CD-ROM (compact disc read-only memory) and installed in the computer from the recording medium. Alternatively, the bone number determination program may be downloaded from a server connected to the computer through a network, such as the Internet, and installed in the computer.

The bone number determination apparatus 1 of the present invention includes an image storage means 10, a body-of-sternum area extraction means 11, a rib area extraction means 12, a rib number determination means 13, a vertebra area extraction means 14, and a vertebra number determination means 15. The image storage means 10 stores a three-dimensional image composed of a plurality of tomograms (tomographic images, slice images or cross-sectional images) obtained by imaging the human body of a patient (subject). The body-of-sternum area extraction means 11 extracts a body-of-sternum area, and the rib area extraction means 12 extracts a rib area. The rib number determination means 13 determines the rib number of each of rib areas based on the position of the body of sternum and the position of each of the rib areas. The vertebra area extraction means 14 extracts a vertebra area, and the vertebra number determination means 15 determines the vertebra number of each of the vertebrae based on the rib number of each of the rib areas, the position of each of the rib areas, and the position of each of the vertebrae.

The image storage means 10 is a storage device, such as a hard disk, and stores a three-dimensional image composed of a series of tomograms that have been obtained in one examination by a tomography apparatus. Examples of the tomography apparatus are a CT (Computed Tomography) apparatus, an MRI (Magnetic Resonance Imaging) apparatus, a PET (Positron Emission Tomography) apparatus and the like. The present invention will be specifically described with regard to a three-dimensional image obtained by a CT apparatus. In the following description, the term "tomogram (tomographic image)" refers to an axial image, unless otherwise specified.

The vertebra area extraction means 14 includes a vertebra position determination means 20 that determines the positions of ends of a vertebra. The vertebra area extraction means 14 uses the information about the positions of the ends of the vertebra, and extracts a vertebra area that is segmented at the ends of the vertebra. The vertebra area represents each of vertebrae into which the vertebral column is separated.

Figure 2:
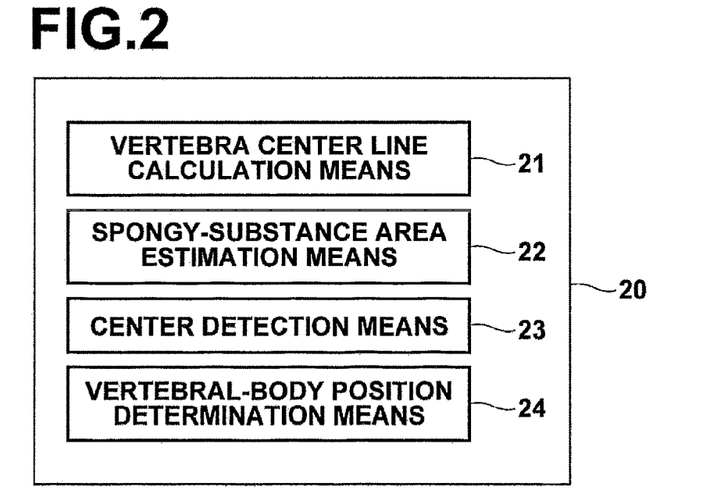
FIG. 2 is a schematic diagram illustrating the configuration of a vertebra position determination means.

The vertebra position determination means 20 automatically calculates the positions of both ends of a vertebra in a tomogram obtained, for example, by a CT apparatus. As illustrated in FIG. 2, the vertebra position determination means 20 includes a vertebra center line calculation means 21, a spongy-substance area estimation means 22, a center detection means 23, and a vertebral-body position determination means 24.

The vertebra center line calculation means 21 obtains the center line of vertebrae, which forms a line, based on a plurality of tomograms that represent cross-sectional planes of the vertebrae.

Figure 3:
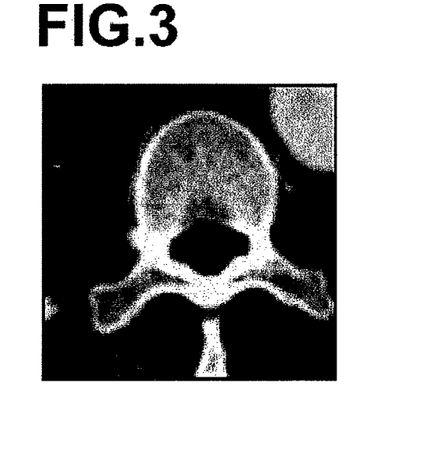
FIG. 3 is an example of a tomogram of a vertebra.

First, a spinal-cord area is extracted from a three-dimensional image. As illustrated in FIG. 3, the spinal-cord area exhibits a typical pattern in tomograms. Therefore, it is possible to stably detect the spinal-cord area from the tomograms. Specifically, for example, a multiplicity of areas, each having a predetermined size, are set with respect to each pixel in each of the tomograms. Then, an identifier generated by using a machine learning method is used to identify (judge or distinguish) whether each of the set areas is a spinal-cord area, thereby detecting the spinal-cord area.

Next, a spinal-cord center line is generated using center points of a plurality of spinal-cord areas that have been detected. A pixel that is present substantially at the center of a spinal-cord area is set as the center point of the spinal-cord area. It is not necessary that the center point is located at an exact center of the spinal-cord area. The center point may be a point that is substantially equidistant from the circumference (border) of the spinal-cord area. Alternatively, the center point may be a point that is substantially equidistant from predetermined two ends of the spinal-cord area. The center point may be the center of gravity.

Figure 4:
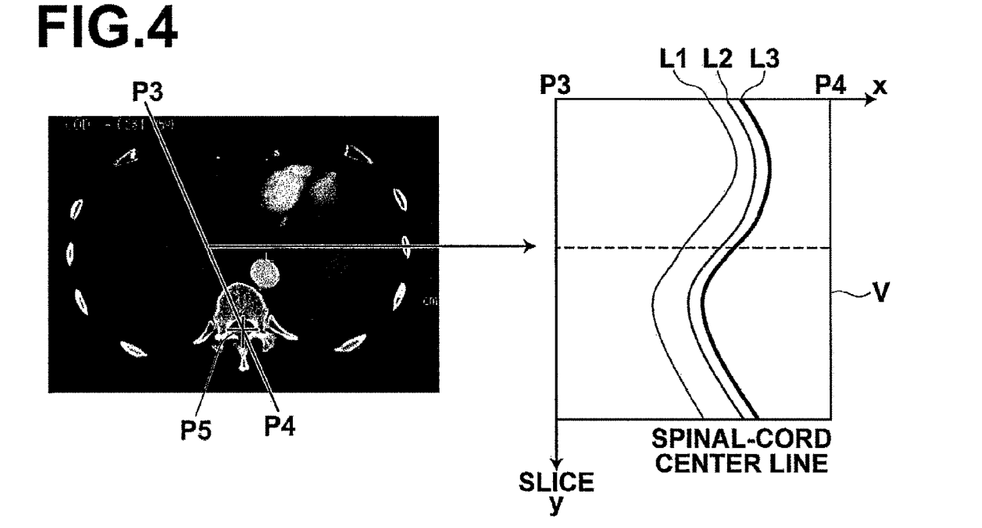
FIG. 4 is a diagram for explaining a method for calculating the center line of a spinal cord.

Further, a longitudinal cross-sectional image (vertical cross-sectional image) is generated by re-slicing the tomograms along the spinal-cord center line in the direction of the body axis. As illustrated in FIG. 4, center point P5 of a spinal-cord area obtained from each of the tomograms is used as a base point, and the brightness value of each pixel on a straight line connecting point P3 and point P4, the straight line inclining counterclockwise from Y-axis by α degrees, is extracted. Then, the extracted brightness values of the pixels on the straight line connecting point P3 and point P4 in each of the tomograms (the straight line corresponding to the direction of X-axis in the right half of FIG. 4) are piled (stacked) one on another in the order of slice numbers of the tomograms (the order corresponding to the direction of Y-axis in the right half of the diagram illustrated in FIG. 4). Accordingly, longitudinal cross-sectional image V is generated. Since a multiplicity of blood vessels or the like are present in the cardiac region (heart), a stable pattern is not obtained in the cardiac area. Therefore, the straight line connecting point P3 and P4 should be set in such a manner that the straight line passes the center point and the spinal area, but does not pass the cardiac area.

Further, the borders of vertebrae are detected in the longitudinal cross-sectional image V. In the longitudinal cross-sectional image V, spinal-cord center line L3 appears as a single curved line. Further, the spinal area including two trabecula lines, which have high CT values (pixel values), and a spongy-substance area (a cancellous-bone area or a spongy-bone area) between the two trabecula lines appear on the left side of the spinal-cord center line L3. The spongy-substance area has low CT values (pixel values). In the longitudinal cross-sectional image V illustrated in FIG. 4, the pixels values are observed in the X-direction to obtain an edge that exhibits a large positive difference value on the ventral side of the spinal area. Further, an edge that exhibits a large negative difference value is obtained on the dorsal side of the spinal area. Further, linear transformation is performed on the spinal-cord center line L3 to fit the spinal-cord center line L3 to edge line L2 on the dorsal side of the spinal area, thereby obtaining edge curved line L5. Similarly, edge curved line L4 is obtained with respect to edge curved line L1 on the ventral side of the spinal area.

Figure 5:
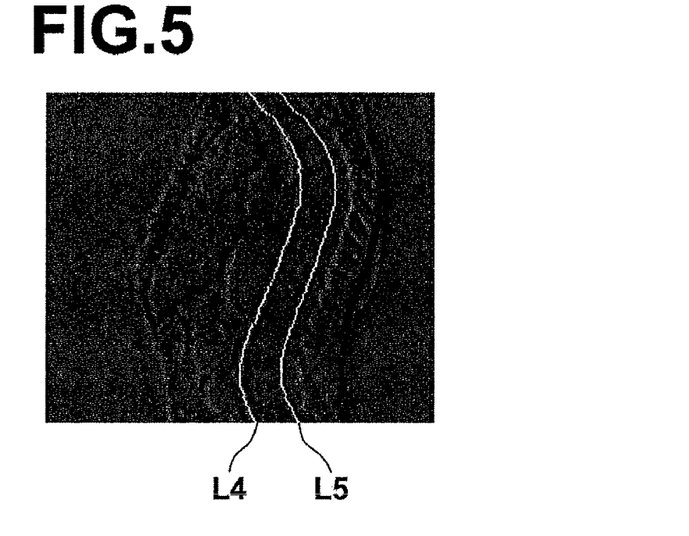
FIG. 5 is a diagram for explaining a method for calculating the left/right borders of the vertebrae.

The obtained curved lines L4 and L5, as illustrated in FIG. 5, are left/right borders of the vertebrae including the spinal area. Further, the center line of the vertebrae and the width of the vertebra or vertebrae can be calculated based on the obtained curved lines L4 and L5, which are the left/right border.

The spongy-substance area estimation means 22 estimates a spongy-substance area by using pixels in an area in the vicinity of the center line of the vertebrae that has been obtained by the vertebra center line calculation means 21. Since a lesion or abnormality (deformation) of a vertebra or vertebrae may be present in a three-dimensional image obtained by imaging, it is possible to more stably detect the spongy substance by using only the area in the vicinity of the center line of the vertebrae instead of the entire area of the three-dimensional image. In Non-Patent Literature 1 and Non-Patent Literature 2, intervertebral regions are extracted first to segment the vertebrae. However, if the spongy-substance area, which can be relatively stably detected based on the image pattern thereof, is extracted first, and the intervertebral regions are obtained based on the detected spongy-substance area, it is possible to accurately obtain the intervertebral regions.

Figure 6:
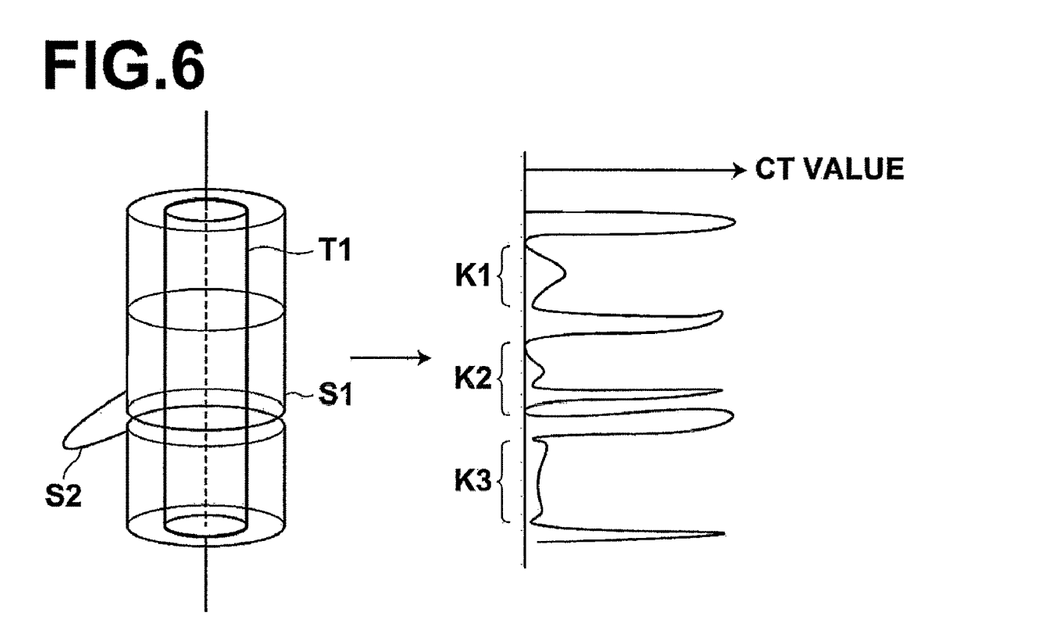
FIG. 6 is a diagram for explaining a method for determining the positions of vertebrae.

FIG. 6 is a conceptual diagram illustrating vertebrae, vertebral bodies and the like. Cylinder (Tube) S1 illustrated in FIG. 6 represents a vertebral body or vertebral bodies. The surface of the cylinder S1 corresponds to the lateral cortex region of the vertebral body, and the top plate and the bottom plate of the cylinder S1 correspond to the up/down endplates of the vertebral body, respectively. Projection S2 represents a bone proliferation (growth) region. Tube portion T1 represents a region in the vicinity of the center of the spinal cord. When CT values (pixel values) of the tube portion T1 are added in the transverse direction (horizontal direction), a graph as illustrated on the right side of FIG. 6 is obtained. In some cases, an intervertebral area is lost and not present in tomograms by a so-called virtual volume effect. However, as illustrated in the graph of FIG. 6, low CT value (pixel value) areas (for example, K1, K2 and K3), which correspond to the spongy-substance areas, appear. However, in the graph, a trough at an intervertebral region may not be clearly distinguished because of the bone proliferation region of projection S2. Therefore, when the spongy-substance area is damaged (crushed) as in a three-dimensional image representing the human body of a patient suffering from a serious compression fracture, and there is a possibility that the CT values (pixel values) in the spongy-substance area become high, the addition value of the CT values (pixel values) is not used for judgment. Instead, the edge in the direction of the body axis is detected. If the edge in the direction of the body axis is detected, the spongy-substance area can be detected even if the compression fracture is present in the image.

The center detection means 23 detects the three-dimensional center of the spongy-substance area estimated by the spongy-substance area estimation means 22 in each of the vertebral bodies. The three-dimensional center of the spongy-substance area can be obtained by performing machine learning in advance. In the machine learning, the feature value of each pixel of a plurality of sample images including spongy-substance areas is learned. An identifier obtained by machine learning is used, and a score indicating the degree of inclusion of a spongy-substance area in the region in the vicinity of the center line of the vertebrae is calculated based on the feature values of pixels in the vicinity of the center line of the vertebrae. Further, the three-dimensional center of the spongy-substance area is detected based on the score.

The vertebral-body position determination means 24 calculates, based on the three-dimensional center of the spongy-substance area in each of the vertebral bodies that has been detected by the center detection means 23, the positions of both ends of each of the vertebral bodies in the body axis direction. The vertebral-body position determination means 24 determines the position of each of the vertebral bodies based on the calculated positions of both ends of each of the vertebral bodies. For example, a middle point of the three-dimensional centers of the spongy-substance areas in two vertebral bodies that are adjacent to each other is determined as an intervertebral region of the two vertebral bodies. Alternatively, the position of the cortex of the vertebral body may be detected by detecting the maximum of the sum of CT values (pixel values) between the three-dimensional centers of the spongy-substance areas in two vertebral bodies that are adjacent to each other (or the intensity of the edge). Further, the ends of the vertebral bodies may be determined based on the detected positions of the cortexes of the vertebral bodies.

The rib area extraction means 12 separates rib areas, each including a rib, from each other to extract the rib areas from a three-dimensional image representing a human body.

For example, the rib areas may be extracted by using a method disclosed in U.S. Patent application publication No. 20060062425 (hereinafter, referred to as "Reference Literature 1"). Reference Literature 1 discloses a technique based on high-speed tracing for extracting a rib area from a three-dimensional image. This technique may be used to extract ribs, and to obtain rib areas, each representing a single rib.

Figure 7:
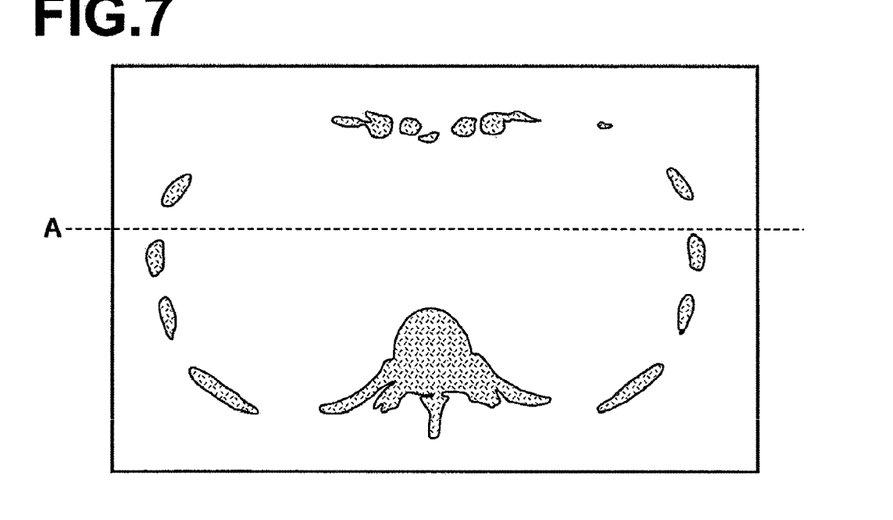
FIG. 7 is a diagram illustrating an example of a tomogram of a region including a vertebra and ribs.

Alternatively, the rib areas may be detected by using a density histogram of bone areas. FIG. 7 is a tomographic image of a vertebra and rib portions. First, the center line of the vertebra and the width (transverse width) of the vertebra are obtained. For that purpose, in the bone area illustrated in FIG. 7, an area that is lower than center line A in the transverse direction of the body surface of a subject is projected onto the vertical axis, and the density histogram is generated (the center line A is a line in the transverse direction of the body of the subject, which is perpendicular to the anterior/posterior direction of the body, at an anterior/posterior-direction center of a cross section perpendicular to the direction of the body axis of the subject connecting the head and the feet of the subject).

Figure 8:
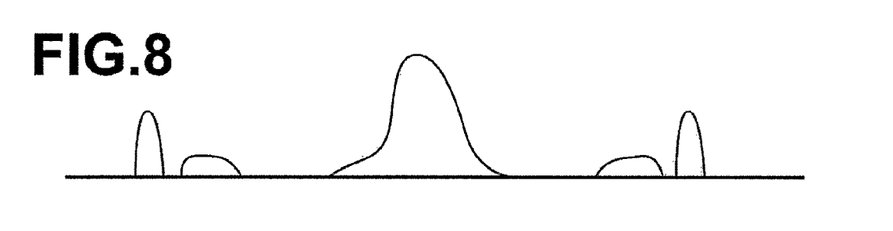
FIG. 8 is a density histogram of bone regions.

FIG. 8 illustrates a density histogram of bone areas that has been generated as described above. In the histogram illustrated in FIG. 8, a high peak is present at a middle of the histogram, and small peaks (low peaks) are present on the left side and the right side of the histogram. It is recognized that the rib portion in the tomogram illustrated in FIG. 7 forms the small peaks in FIG. 8, and that the vertebra in the tomogram illustrated in FIG. 7 forms the highest peak in FIG. 8, because a largest bone area is present in the vertebra. Therefore, the highest peak at the middle of the histogram is extracted from the histogram illustrated in FIG. 8. Further, an area corresponding to the highest peak is detected as a vertebra area.

Figure 9:
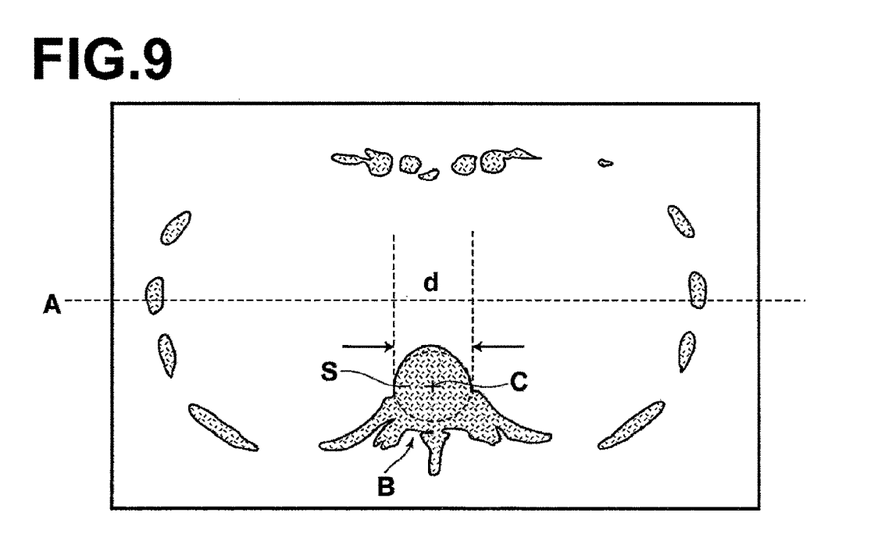
FIG. 9 is a diagram showing the center and the width of a vertebra.

Then, as illustrated in FIG. 9, circle S is fitted into an upper portion (anterior portion) of detected vertebra area B to obtain center C of the vertebra and width d of the vertebra. Further, the vertebra area, left/right rib areas and a sternum area are recognized by using the center C of the vertebra and the width d of the vertebra.

Figure 10:
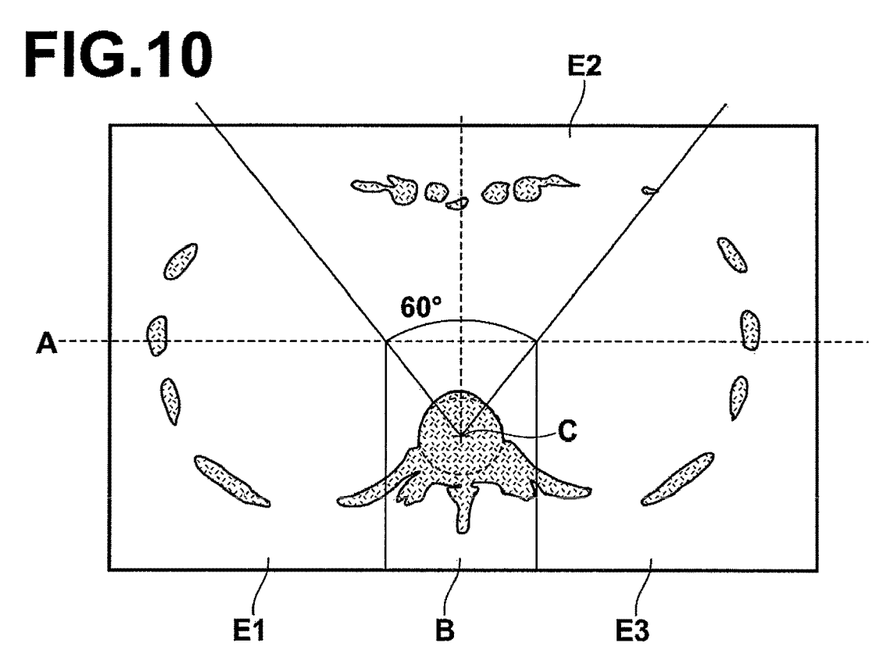
FIG. 10 is a diagram in which a tomogram is divided into a vertebra area, a right rib area, a sternum area, and a left rib area.

As illustrated in FIG. 10, two half lines (rays), each forming an angle of 60 degrees with respect to the center C of the vertebra, which has been obtained as described above, are drawn on the upper side of the center C of the vertebra. Further, two straight lines that are orthogonal to the center line A in the transverse direction of the body surface of the subject are drawn in such a manner that the center C of the vertebra is positioned at the center of the two straight lines. The distance between the two straight lines is the width of the vertebra area. The width of the vertebra area is set in such a manner that the width is 1.5 times longer than the aforementioned width d of the vertebra. As described above, the two half lines and the two straight lines that are orthogonal to the center line A in the transverse direction of the body surface of the subject are drawn. Further, the bone area in a tomogram illustrated in FIG. 10 is divided into four areas. The divided four areas are determined as vertebra area B, right rib area E1, sternum area E2, and left rib area E3.

As described above, bones are recognized as unit parts, such as the vertebra, the right rib, the sternum, and the left rib. In all of the tomograms of the three-dimensional image, each part is recognized. Further, the area of a rib detected from each of the tomograms is piled one on another in the order of the slice numbers of the images, and an area formed by piling is extracted as a rib area.

Figure 11:
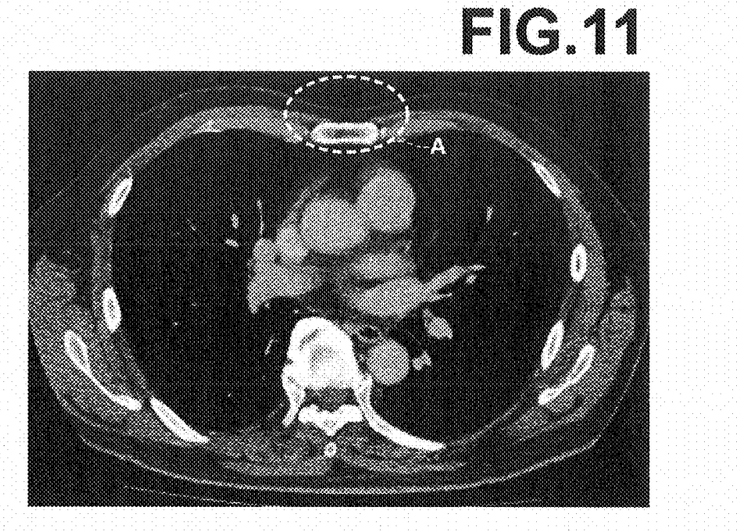
FIG. 11 is an example of a tomogram of the body of sternum.

The body-of-sternum area extraction means 11 extracts the body-of-sternum area from the three-dimensional image. In tomograms, the body of sternum appears as a rectangular area that has substantially the same thickness therethrough, as illustrated in FIG. 11. Further, the body of sternum includes a lumen (spongy substance) (please refer to portion A in FIG. 11). Therefore, the body of sternum can be detected by pattern recognition. In a tomogram (cross-section) of the chest, the body of sternum appears at a position closer to the anterior side of the human body, which is opposite to the position of the vertebra. Therefore, a rectangular area is detected from an area close to the anterior surface of the human body (or an area in the vicinity of the anterior surface of the human body) in each tomogram. Further, the rectangular area detected in each of the tomograms is piled (stacked) one on another in the order of the slice numbers of the tomograms, and an area formed by piling the rectangular areas is extracted as a body-of-sternum area.

Figure 12:
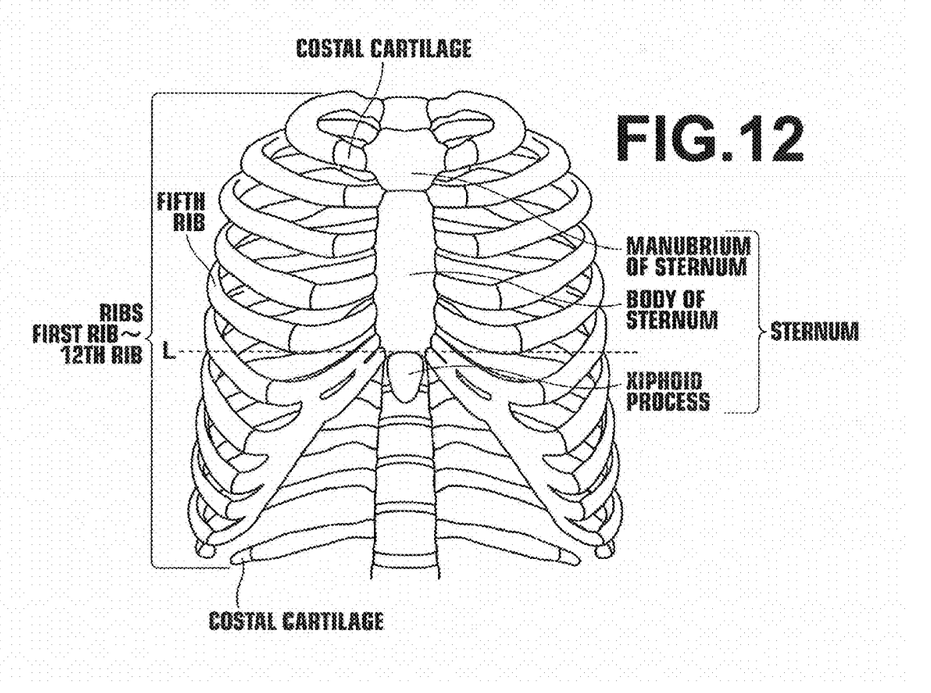
FIG. 12 is a diagram for explaining connections between the body of sternum and ribs.

The rib number determination means 13 determines the rib number based on the manner in which the rib area and the body-of-sternum area are connected to each other. As illustrated in FIG. 12, anatomically, second ribs through ten ribs are connected to the body of sternum. Further, substantially the entire area of each of first ribs through fifth ribs is positioned above lower border L of the body of sternum. Therefore, it is possible to identify, as the fifth rib, the rib of a rib area, the substantially entire area of which is located at a higher position than the lower border L of the body of sternum, and that is located at the lowest position among all of the rib areas that are connected to the body of sternum (the rib number is five or fifth). Further, the rib number of each of the other rib areas is determined based on the fifth rib area in the order of arrangement of the rib areas.

The vertebra number determination means 15 determines the vertebra number of each of the vertebra areas based on the rib numbers of the rib areas and the manner in which the rib areas and the vertebra areas are connected to each other.

Figure 13:
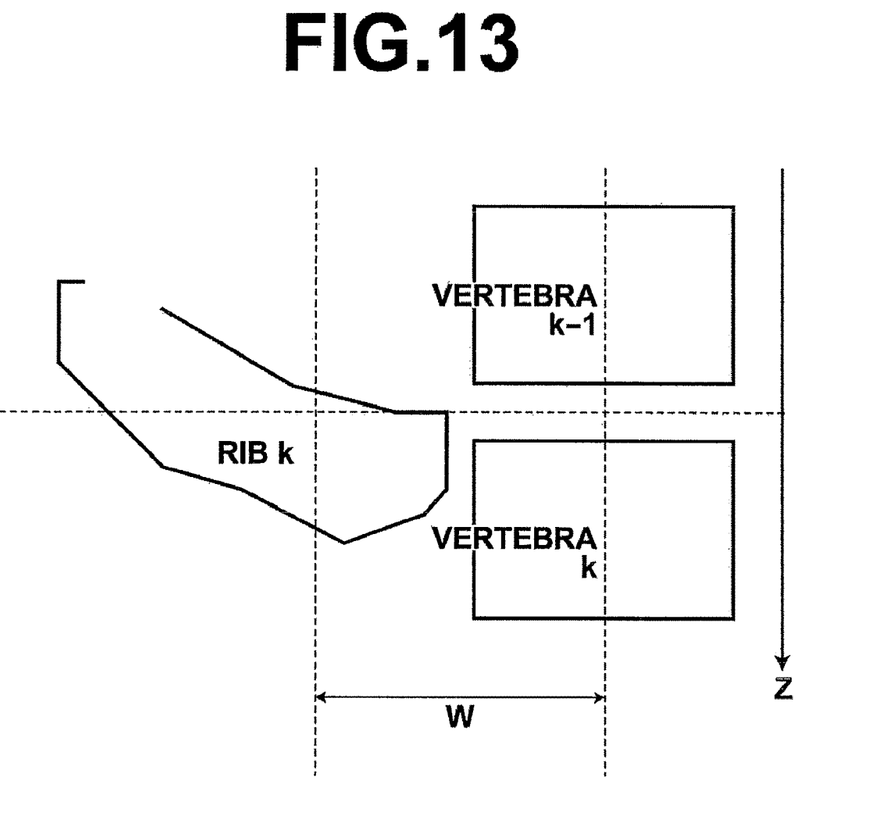
FIG. 13 is a diagram for explaining a connection between a vertebra and a rib.

One of methods for obtaining information about to which vertebra area a rib area is connected is illustrated in FIG. 13. In FIG. 13, first, a certain width W is determined with respect to the center line of the vertebra area, in other words, a certain distance W is set from the center line of the vertebra area (for example, the width of the vertebra may be used as the width W). A portion of a rib area of rib number k, the portion being present within a range determined by the distance W from the center line, is projected onto Z-axis in the diagram illustrated in FIG. 13 to obtain a range in which the rib area appears in the direction of the Z-axis. Similarly, the vertebra areas are projected onto the Z-axis in the diagram illustrated in FIG. 13 to obtain a range in which each of the vertebra areas appears in the Z-axis. Further, one of the vertebra areas that has a largest overlapping area with the rib area having the rib number k is judged as a vertebra connected to the rib having the rib number k. Further, the vertebra number of the vertebra area is determined as k.

Figure 14:
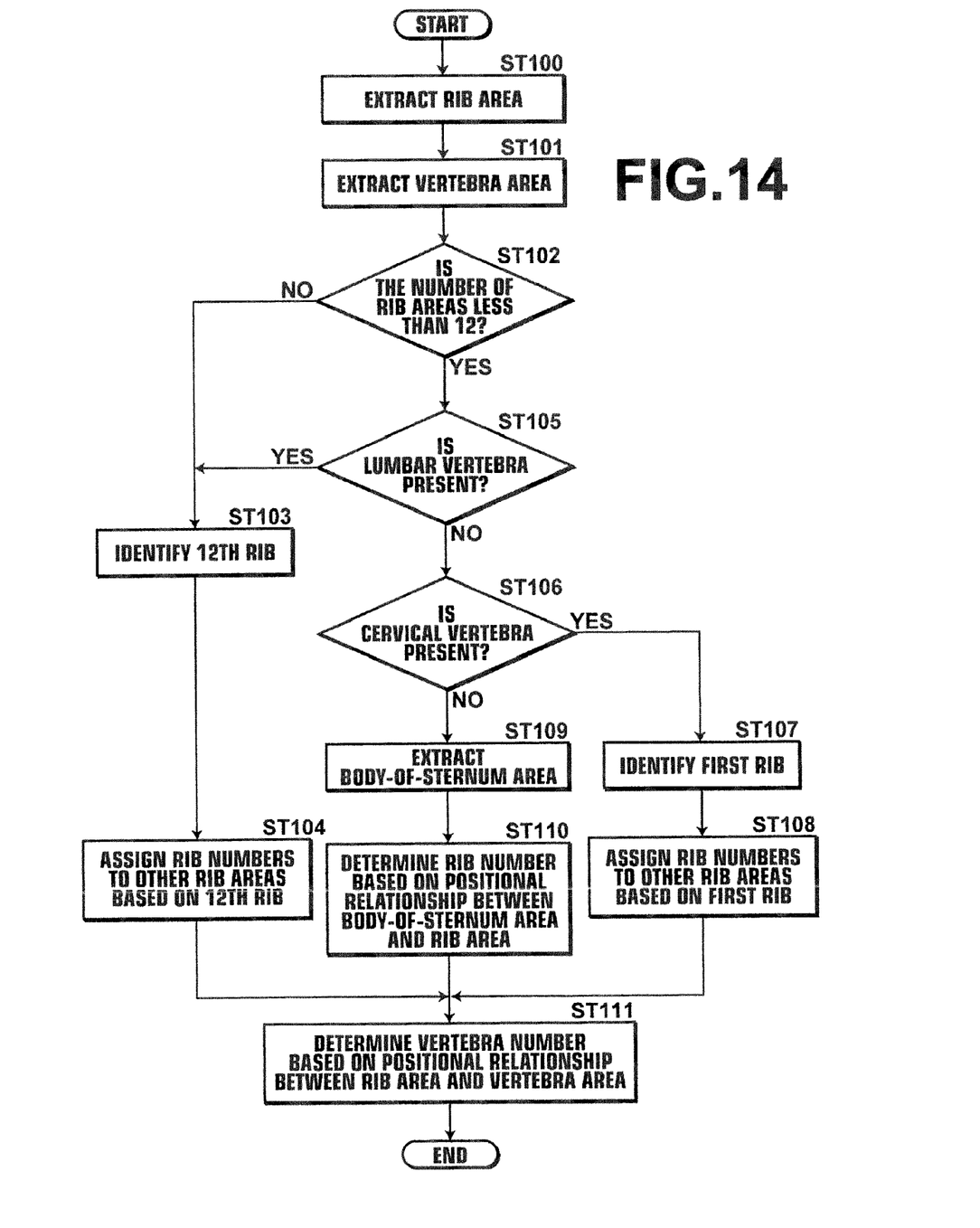
FIG. 14 is a flowchart showing the flow of processing by the bone number determination apparatus.

Next, with reference to a flowchart illustrated in FIG. 14, the flow of processing by the bone number determination apparatus will be described.

First, the rib area extraction means 12 extracts all of rib areas imaged from a three-dimensional image stored in the image storage means 10 (step ST100). Next, the vertebra area extraction means 14 extracts a spinal-cord area from the three-dimensional image. Further, the vertebra area extraction means 14 automatically calculates the positions of both ends of each of vertebrae, and separates the vertebrae into each of vertebra areas (step ST101).

Further, the number of the extracted rib areas is counted (step ST102). When the number of the rib areas is 12, the twelfth rib area is identified (step ST103), and the twelfth rib area is used as a base area. Further, rib numbers are sequentially assigned to other rib areas, based on the twelfth rib area, in descending order (11, 10, . . . 1) toward the upper side (step ST104).

When the number of the rib areas is less than 12, judgment is made as to whether a lumbar vertebra (or a hip bone) is imaged in the three-dimensional image. If the lumbar vertebra (or a hip bone) is imaged in the three-dimensional image (step ST105), the lowest rib of the ribs is imaged. Therefore, the rib number of the lowest rib area is identified as 12, in other words, the lowest rib area is identified as the twelfth rib area (step ST103), and the twelfth rib area is used as a base area. Further, rib numbers are sequentially assigned to other rib areas, based on the twelfth rib area, in descending order (11, 10, . . . ) toward the upper side (step ST104). When the number of the rib areas is less than 12, and the lumbar vertebra (or a hip bone) is not imaged in the three-dimensional image, judgment is made as to whether a cervical vertebra (or a neck bone) is imaged. If the cervical vertebra (or a neck bone) is imaged, the highest rib of the ribs is imaged (step ST106). Therefore, the rib number of the highest rib is identified as 1, in other words, the highest rib is identified as the first rib (step ST107), and the first rib area is used as a base area. Further, rib numbers are sequentially assigned to other rib areas, based on the first rib area, in ascending order (2, 3, . . . ) toward the lower side (step ST108).

Further, the vertebra number determination means 15 determines the vertebra number of each of the vertebra areas based on the rib numbers of the rib areas and the manner in which the rib areas and the vertebra areas are connected to each other (step ST111).

When the number of the rib areas is less than 12, and neither the lumbar vertebra (or a hip bone) nor the cervical vertebra (or a neck bone) is imaged, the body-of-sternum area extraction means 11 extracts a body-of-sternum area from the three-dimensional image (step ST109). Further, the rib number determination means 13 determines the rib number based on the manner in which the rib area is connected to the body-of-sternum area (step ST110).

Next, the vertebra number determination means 15 determines the vertebra number of each of the vertebrae based on the rib numbers of the rib areas and the manner in which the rib areas and the vertebra areas are connected to each other (step ST111).

In the aforementioned case, when all of 12 rib areas are recognized, or when the first rib or the twelfth rib is recognized, the rib numbers are identified without recognizing the body of sternum. Alternatively, the body of sternum may always be recognized to identify the position of the body of sternum and the position of the fifth rib, and the rib numbers of other ribs may be identified.

As described above in detail, even if not all of 12 ribs are imaged, it is possible to determine the rib numbers of ribs based on the body of sternum. Further, it is possible to determine the vertebra numbers of the vertebrae based on information about to which vertebra each of the ribs is connected.

What is claimed is:

1. A bone number determination apparatus comprising:
   an image storage means that stores a three-dimensional image composed of a plurality of tomograms obtained by imaging a human body;
   a body-of-sternum area extraction means that extracts a body-of-sternum area representing the body of sternum of the human body from the three-dimensional image;
   a rib area extraction means that extracts at least one rib area, each representing an individual rib, from the three-dimensional image; and
   a rib number determination means that determines the rib number of each of the at least one rib area by identifying a fifth rib area based on a position of the body-of-sternum area extracted by the body-of-sternum area extraction means, the position corresponding to a lower border of the body of sternum, and the position corresponding to the lower border of each of the at least one rib area.

2. A bone number determination apparatus, as defined in claim 1, wherein the rib number determination means determines the fifth rib area as the rib area whose lower border is located at the lowest position among all the rib areas whose lower border is located at a higher position than the position corresponding to the lower border of the body of sternum.

3. A bone number determination apparatus, as defined in claim 2, wherein the vertebra number determination means determines that the rib number of one of the at least one rib area that has a largest overlapping projection area with a projection area of one of the at least one vertebra area when a portion of each of the at least one rib area, the portion being present within a predetermined distance from a center line of the at least one vertebra area along the direction of the body axis of the human body, and the at least one vertebra area are projected onto the body axis is the vertebra number of the one of the at least one vertebra area.

4. A bone number determination apparatus comprising:
an image storage means that stores a three-dimensional image composed of a plurality of tomograms obtained by imaging a human body;
a body-of-sternum area extraction means that extracts a body-of-sternum area representing the body of sternum of the human body from the three-dimensional image;
a rib area extraction means that extracts at least one rib area, each representing an individual rib, from the three-dimensional image;
a rib number determination means that determines the rib number of each of the at least one rib area based on a position of the body-of-sternum area extracted by the body-of-sternum area extraction means, the position corresponding to a lower border of the body of sternum, and the position of each of the at least one rib area;
a vertebra area extraction means that extracts at least one vertebra area, each representing an individual vertebra, from the three-dimensional image; and
a vertebra number determination means that determines the vertebra number of each of the at least one vertebra area based on the position of each of the at least one rib area, the rib number of each of the at least one rib area that has been determined by the rib number determination means, and the position of the at least one vertebra area.

5. A bone number determination apparatus, as defined in claim 4, wherein the rib number determination means determines that a rib area that is located at a higher position than the position corresponding to the lower border of the body of sternum and that is located at the lowest position among the at least one rib area that is connected to the body-of-sternum area is a fifth rib.

6. A bone number determination apparatus, as defined in claim 5, wherein the vertebra number determination means determines that the rib number of one of the at least one rib area that has a largest overlapping projection area with a projection area of one of the at least one vertebra area when a portion of each of the at least one rib area, the portion being present within a predetermined distance from a center line of the at least one vertebra area along the direction of the body axis of the human body, and the at least one vertebra area are projected onto the body axis is the vertebra number of the one of the at least one vertebra area.

7. A bone number determination apparatus, as defined in claim 4, wherein the vertebra number determination means determines that the rib number of one of the at least one rib area that has a largest overlapping projection area with a projection area of one of the at least one vertebra area when a portion of each of the at least one rib area, the portion being present within a predetermined distance from a center line of the at least one vertebra area along the direction of the body axis of the human body, and the at least one vertebra area are projected onto the body axis is the vertebra number of the one of the at least one vertebra area.

8. A non-transitory computer-readable recording medium having stored therein a program for causing a computer to function as:
a body-of-sternum area extraction means that extracts a body-of-sternum area representing the body of sternum of a human body from a three-dimensional image composed of a plurality of tomograms obtained by imaging the human body;
a rib area extraction means that extracts at least one rib area, each representing an individual rib, from the three-dimensional image; and
a rib number determination means that determines the rib number of each of the at least one rib area by identifying a fifth rib area based on a position of the body-of-sternum area extracted by the body-of-sternum area extraction means, the position corresponding to a lower border of the body of sternum, and the position corresponding to the lower border of each of the at least one rib area.

9. A non-transitory computer-readable recording medium having stored therein a program for causing a computer to function as:
a body-of-sternum area extraction means that extracts a body-of-sternum area representing the body of sternum of a human body from a three-dimensional image composed of a plurality of tomograms obtained by imaging the human body;
a rib area extraction means that extracts at least one rib area, each representing an individual rib, from the three-dimensional image;
a rib number determination means that determines the rib number of each of the at least one rib area based on a position of the body-of-sternum area extracted by the body-of-sternum area extraction means, the position corresponding to a lower border of the body of sternum, and the position of each of the at least one rib area;
a vertebra area extraction means that extracts at least one vertebra area, each representing an individual vertebra, from the three-dimensional image; and
a vertebra number determination means that determines the vertebra number of each of the at least one vertebra area based on the position of each of the at least one rib area, the rib number of each of the at least one rib area that has been determined by the rib number determination means, and the position of the at least one vertebra area.

* * * * *